(12) United States Patent
Li

(10) Patent No.: US 9,732,220 B2
(45) Date of Patent: Aug. 15, 2017

(54) POLYMERS AND POLYMER BLENDS WITH ENHANCED GLOSS LEVEL

(71) Applicant: BAYER MATERIALSCIENCE LLC, Pittsburgh, PA (US)

(72) Inventor: Xiangyang Li, Seven Fields, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/773,888

(22) PCT Filed: Mar. 11, 2014

(86) PCT No.: PCT/US2014/023029
§ 371 (c)(1),
(2) Date: Sep. 9, 2015

(87) PCT Pub. No.: WO2014/164623
PCT Pub. Date: Oct. 9, 2014

(65) Prior Publication Data
US 2016/0024300 A1 Jan. 28, 2016

Related U.S. Application Data

(60) Provisional application No. 61/778,568, filed on Mar. 13, 2013.

(51) Int. Cl.
*C08L 69/00* (2006.01)
*C08L 9/00* (2006.01)
*C08L 83/04* (2006.01)
*C08K 3/22* (2006.01)
*C08K 3/38* (2006.01)

(52) U.S. Cl.
CPC ........... *C08L 69/00* (2013.01); *C08L 9/00* (2013.01); *C08L 83/04* (2013.01); *C08K 2003/2227* (2013.01); *C08K 2003/387* (2013.01); *C08L 2201/02* (2013.01); *C08L 2205/03* (2013.01); *C08L 2207/04* (2013.01)

(58) Field of Classification Search
CPC ...................................................... C08L 69/00
USPC ....................................................... 524/430
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 2,999,846 A | 9/1961 | Schnell et al. |
| 3,028,356 A | 4/1962 | Shepard |
| 3,028,365 A | 4/1962 | Schnell et al. |
| 3,030,331 A | 4/1962 | Goldberg |
| 3,148,172 A | 9/1964 | Fox |
| 3,153,008 A | 10/1964 | Fox |
| 3,169,121 A | 2/1965 | Goldberg |
| 3,271,367 A | 9/1966 | Schnell et al. |
| 3,395,119 A | 7/1968 | Blaschke et al. |
| 3,462,249 A | 8/1969 | Tunkel |
| 3,544,514 A | 12/1970 | Schnell et al. |
| 3,659,779 A | 5/1972 | Berkman et al. |
| 3,729,447 A | 4/1973 | Haberland et al. |
| 3,879,348 A | 4/1975 | Serini et al. |
| 3,890,266 A | 6/1975 | Serini et al. |
| 3,912,688 A | 10/1975 | Schiller et al. |
| 4,185,009 A | 1/1980 | Idel et al. |
| 4,255,556 A | 3/1981 | Segal et al. |
| 4,260,731 A | 4/1981 | Mori et al. |
| 4,369,303 A | 1/1983 | Mori et al. |
| 4,714,746 A | 12/1987 | Serini et al. |
| 4,888,388 A | 12/1989 | Hongo et al. |
| 4,963,619 A | 10/1990 | Wittmann et al. |
| 5,086,157 A | 2/1992 | Reuter et al. |
| 5,104,723 A | 4/1992 | Freitag et al. |
| 5,105,004 A | 4/1992 | Reuter et al. |
| 5,109,076 A | 4/1992 | Freitag et al. |
| 5,126,428 A | 6/1992 | Freitag et al. |
| 5,367,044 A | 11/1994 | Rosenquist |
| 6,306,507 B1 | 10/2001 | Brunelle et al. |
| 6,528,612 B1 | 3/2003 | Brenner et al. |
| 6,566,428 B1 * | 5/2003 | Eckel ............... C08K 5/523 524/115 |
| 6,613,869 B1 | 9/2003 | Horn et al. |
| 7,235,598 B1 | 6/2007 | Zobel et al. |
| 7,799,848 B2 | 9/2010 | Rogunova |
| 8,338,513 B2 | 12/2012 | Isozaki et al. |
| 2003/0105196 A1 * | 6/2003 | Seidel ............... C08K 5/103 524/127 |
| 2006/0030664 A1 | 2/2006 | Kim |
| 2006/0094813 A1 | 5/2006 | Warth et al. |
| 2007/0129492 A1 * | 6/2007 | Colborn ............ B64C 1/1492 525/100 |
| 2009/0123676 A1 * | 5/2009 | Kato ............... B41M 5/502 428/32.25 |
| 2010/0160532 A1 | 6/2010 | Park et al. |

(Continued)

FOREIGN PATENT DOCUMENTS

| | | |
|---|---|---|
| GB | 885442 | 12/1961 |
| GB | 1079821 | 1/1966 |

(Continued)

*Primary Examiner* — Doris Lee
(74) *Attorney, Agent, or Firm* — Richard P. Bender

(57) ABSTRACT

The present invention provides a polycarbonate composition containing hydroxy aluminum hydroxide which exhibits increased gloss level. This effect is seen in polycarbonate blend or blends of polycarbonate and polyesters. This additive is effective in increasing the gloss level of polymer or polymer blend with gloss levels lower than 80 at 20 degree incident angle.

10 Claims, No Drawings

(56) References Cited

U.S. PATENT DOCUMENTS

2010/0256270 A1* 10/2010 Souma .................. B82Y 30/00
                                                    524/157
2011/0130517 A1*  6/2011 Li ......................... C08L 67/02
                                                     525/64

FOREIGN PATENT DOCUMENTS

| GB | 1122003 | 7/1968 |
| GB | 1367788 | 9/1974 |
| GB | 1367789 | 9/1974 |
| GB | 1367790 | 9/1974 |
| GB | 1368338 | 9/1974 |
| JP | 2006206691 | 8/2006 |
| WO | WO 2009/105087 | * 8/2009 |

* cited by examiner

POLYMERS AND POLYMER BLENDS WITH ENHANCED GLOSS LEVEL

CROSS REFERENCE TO RELATED APPLICATION

This application claims the benefit, under 35 USC §119 (e), of U.S. provisional patent application No. 61/778,568, filed Mar. 13, 2013, entitled "POLYMERS AND POLYMER BLENDS WITH ENHANCED GLOSS LEVEL" the entire disclosure of which is hereby incorporated by reference.

FIELD OF THE INVENTION

The present invention relates in general to plastics and more specifically to polymers and polymer blends with enhanced gloss level.

BACKGROUND OF THE INVENTION

Gloss is based on the interaction of light with physical characteristics of a surface. It is the ability of a surface to reflect light into the specular direction. The factors that affect gloss are the refractive index of the material, the angle of incident light and the surface topography. It is relatively easy to lower the gloss of a material by deliberately roughening a material's surface; in contrast, it is relatively more difficult to increase a material's gloss if the surface quality has reached its practical limit.

SUMMARY OF THE INVENTION

Accordingly, the present invention provides a polycarbonate composition containing hydroxy aluminum hydroxide which exhibits increased gloss level. This effect is seen in polycarbonate blend or blends of polycarbonate and polyesters. This additive is effective in increasing the gloss level of polymer or polymer blend with gloss levels lower than 80 at 20 degree incident angle.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a thermoplastic molding composition comprising:
A) 50 to 98 wt. % aromatic poly(ester) carbonate having a weight-average molecular weight of at least 25,000;
B) a flame retardant;
C) 1 to 20 wt. % of a graft (co)polymer having a core-shell morphology, including a grafted shell that contains polymerized alkyl(meth)acrylate and a composite rubber core that contains interpenetrated and inseparable polyorganosiloxane and poly(meth)alkyl acrylate components, wherein said core is in the form of particles having median particle size of 0.05 to 5 microns and glass transition temperature below 0° C., and wherein weight ratio of polyorganosiloxane/poly(meth)alkylacrylate/rigid shell is 70-90/5-15/5-15;
D) greater than zero wt. % to 7.0 wt. % aluminum oxide, wherein the sum of the wt. %, totals 100 and wherein the composition exhibits an increased gloss level at 20 degrees over that of a similar composition not containing aluminum oxide.

A. Polycarbonate

The term polycarbonate as used in the context of the present invention refers to homopolycarbonates and copolycarbonates (including polyestercarbonates).

Polycarbonates are known and their structure and methods of preparation have been disclosed, for example, in U.S. Pat. Nos. 3,030,331; 3,169,121; 3,395,119; 3,729,447; 4,255,556; 4,260,731; 4,369,303, 4,714,746 and 6,306,507; all of which are incorporated by reference herein. The polycarbonates preferably have a weight average molecular weight of 10,000 to 200,000, more preferably 20,000 to 80,000 and their melt flow rate, per ASTM D-1238 at 300° C., is 1 to 65 g/10 min., preferably 2 to 35 g/10 min. They may be prepared, for example, by the known diphasic interface process from a carbonic acid derivative such as phosgene and dihydroxy compounds by polycondensation (See, German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964).

In the present context, dihydroxy compounds suitable for the preparation of the polycarbonates of the invention conform to the structural formulae (1) or (2).

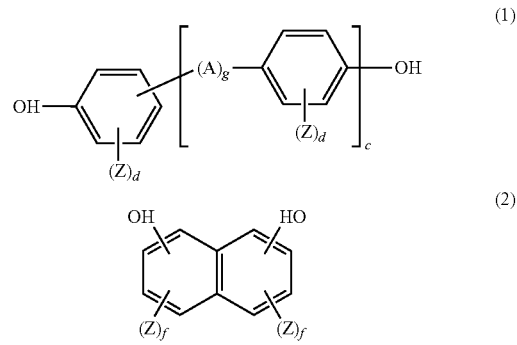

wherein,

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a single bond, a carbonyl group, an oxygen atom, a sulfur atom, —SO— or —SO$_2$ or a radical conforming to

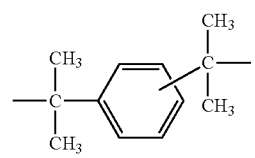

e and g both denote the number 0 to 1;

Z denotes F, Cl, Br or C$_1$-C$_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol bis-(hydroxyphenyl)-alkanes, bis-(hydroxyphenyl)-ethers, bis-(hydroxyphenyl)-ketones, bis-(hydroxy-phenyl)-sulfoxides, bis-(hydroxyphenyl)-sulfides, bis(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,105,004; 5,126,428; 5,109,076; 5,104,723; 5,086,157; 3,028,356; 2,999,835; 3,148,172; 2,991,273; 3,271,367; and 2,999,846, all of which are incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene 2,2-bis-(3-methyl-4-hydroxyphenyl)-propane, 2,2-bis(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropyl-benzene, 1,1-bis-(4-hydroxy-phenyl)-3,3,5-trimethylcyclohexane, 4,4'-dihydroxydiphenyl, and 4,4'-sulfonyl diphenol. Examples of particularly preferred bisphenols are 2,2-bis-(4-hydroxyphenyl)-propane, 2,2-bis-(3,5-dimethyl-4-hydroxyphenyl)-propane; 1,1-bis-(4-hydroxyphenyl)-cyclohexane and 4,4'-dihydroxydiphenyl. The most preferred bisphenol is 2,2-bis-(4-hydroxyphenyl)-propane (bisphenol A).

The polycarbonates of the invention may entail in their structure units derived from one or more aromatic dihydroxy compounds.

The polycarbonates of the invention may also be branched by condensing therein small quantities, e.g., 0.05 to 2.0 mol % (relative to the bisphenols) of polyhydroxyl compounds as branching agents. Such branching agents suitable in the context of polycarbonate are known and include the agents disclosed in U.S. Pat. Nos. 4,185,009; 5,367,044; 6,528,612; and 6,613,869 which are incorporated herein by reference, preferred branching agents include isatin biscresol and 1,1,1-tris-(4-hydroxyphenyl)ethane (THPE).

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methyl-phenol; 2,4-dihydroxybenzoic acid; 2-(4-hydroxyphenyl)-2-(2,4-dihydroxy-phenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in U.S. Pat. Nos. 3,028,365; 2,999,846; 3,153,008; and 2,991,273 all of which are incorporated herein by reference.

The preferred process for the preparation of polycarbonates is the interfacial polycondensation process. Other methods of synthesis in forming the polycarbonates of the invention, such as disclosed in U.S. Pat. No. 3,912,688, incorporated herein by reference, may be used.

Suitable polycarbonate resins are available in commerce, for instance, under the MAKROLON trademark from Bayer MaterialScience.

B. Thermoplastic Polyester

Various polyesters can be used as the thermoplastic polyester in this invention, but thermoplastic polyesters are obtained by polymerizing bifunctional carboxylic acids and diol ingredients are particularly preferred.

Aromatic dicarboxylic acids, for example, terephthalic acid, isophthalic acid, naphthalene dicarboxylic acid and the like, can be used as these bifunctional carboxylic acids, and mixtures of these can be used as needed. Among these, terephthalic acid is particularly preferred from the standpoint of cost. Also, to the extent that the effects of this invention are not lost, other bifunctional carboxylic acids such as aliphatic dicarboxylic acids such as oxalic acid, malonic acid, adipic acid, suberic acid, azelaic acid, sebacic acid, decane dicarboxylic acid, and cyclohexane dicarboxylic acid; and their ester-modified derivatives can also be used.

As diol ingredients the commonly used ones can be used without difficulty, for example, straight chain aliphatic and cycloaliphatic diols having 2 to 15 carbon atoms, for example, ethylene glycol, propylene glycol, 1,4-butanediol, trimethylene glycol, tetramethylene glycol, neopentyl glycol, diethylene glycol, cyclohexane dimethanol, heptane-1,7-diol, octane-1,8-diol, neopentyl glycol, decane-1,10-diol, etc.; polyethylene glycol; bivalent phenols such as dihydroxydiarylalkanes such as 2,2-bis(4-hydroxylphenyl)propane that can be called bisphenol-A, bis(4-hydroxyphenyl)methane, bis(4-hydroxyphenyl)naphthylmethane, bis(4-hydroxyphenyl)phenylmethane, bis-4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis-(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, and 2,2-bis(4-hydroxyphenyl)-1,1,1,3,3,3-hexafluoropropane; dihyroxydiarylcycloalkanes such as 1,1-bis(4-hydroxyphenyl)cyclohexane, 1,1-bis(3,5-dichloro-4-hydroxyphenyl)cyclohexane, and 1,1-bis(4-hydroxyphenyl)cyclodecane; dihydroxydiarylsulfones such as bis(4-hydroxyphenyl)sulfone, and bis(3,5-dimethyl-4-hydroxyphenyl)sulfone, bis(3-chloro-4-hydroxyphenyl)sulfone; dihydroxydiarylethers such as bis(4-hydroxyphenyl)ether, and bis(3-5-dimethyl-4- hydroxyphenyl)ether; dihydroxydiaryl ketones such as 4,4'-dihydroxybenzophenone, and 3,3',5,5'-tetramethyl-4,4-dihydroxybenzophenone; dihydroxydiaryl sulfides such as bis (4-hydroxyphenyl)sulfide, bis(3-methyl-4-hydroxyphenyl) sulfide, and bis(3,5-dimethyl-4-hydroxyphenyl)sulfide; dihydroxydiaryl sulfoxides such as bis(4-hydroxyphenyl) sulfoxide; dihydroxydiphenyls such as 4,4'-dihydroxyphenyl; dihydroxyarylfluorenes such as 9,9-bis(4-hydroxyphenyl)fluorene; dihydroxybenzenes such as hydroxyquinone, resorcinol, and methylhydroxyquinone; and dihydroxynaphthalenes such as 1,5-dihydroxynaphthalene and 2,6-dihydroxynaphthalene. Also, two or more types of diols can be combined as needed.

In a specific embodiment, the polyester is polyethylene terephthalate, polybutylene terephthalate, polyethylene naphthalate, polybutylene naphthalate, polytrimethylene terephthalate, poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), or a combination comprising at least one of the foregoing polyesters. Polyethylene terephthalate (PET) and polytrimethylene terephthalate (PTT) are particularly suitable as the polyester in the invention.

Thermoplastic polyesters can be produced in the presence or absence of common polymerization catalysts represented by titanium, germanium, antimony or the like; and can be produced by interfacial polymerization, melt polymerization or the like.

The molecular weight of the thermoplastic polyesters that can be used in this invention is not limited as long as the properties of the molded items are not lost, and need to be optimized according to the kinds of thermoplastic polyesters that are used. However, weight average molecular weights, as measured by GPC and calculated as polystyrene, are preferably 10,000 to 200,000, with 20,000 to 150,000 being particularly suitable. If the weight average molecular weight is within the above range, the mechanical characteristics of the molded items when molded are good, and the mold ability is excellent. If thermoplastic polyesters that have a weight average molecular weight less than 10,000 are used, the mechanical properties themselves of the resins are unsatisfactory. For example, the mechanical characteristics of the molded items are unsatisfactory. On the other hand, if the weight average molecular weight is greater than 200,000, the moldability decreases, for example, the melt viscosity during molding increases.

C. Graft (Co)Polymer

The graft (co)polymer suitable in the context of the invention has core/shell structure. It may be obtained by graft polymerizing alkyl(meth)acrylate and optionally a copolymerizable vinyl monomer onto a composite rubber core. The composite rubber core that includes interpenetrated and inseparable interpenetrating network (IPN) type polymer is characterized in that its glass transition temperature is below 0° C., preferably below −20° C., especially below −40° C. The amount of component C present in the inventive composition is 1 to 20, advantageously 2 to 15, preferably 5 to 12, most preferably 7 to 10 wt. %, based on the weight of the composition.

The preferred core is polysiloxane-alkyl(meth)acrylate interpenetrating network (IPN) type polymer that contains polysiloxane and butylacrylate. The shell is a rigid phase, preferably polymerized of methylmethacrylate. The weight ratio of polysiloxane/alkyl(meth)acrylate/rigid shell is 5-90/5-90/5-15.

The rubber core has median particle size ($d_{50}$ value) of 0.05 to 5, preferably 0.1 to 2 microns, especially 0.1 to 1 micron. The median value may be determined by ultracentrifuge measurement (W. Scholtan, H. Lange, Kolloid, Z. und Z. Polymere 250 (1972), 782-1796).

The polyorganosiloxane component in the silicone acrylate composite rubber may be prepared by reacting an organosiloxane and a multifunctional crosslinker in an emulsion polymerization process. It is also possible to insert graft-active sites into the rubber by addition of suitable unsaturated organosiloxanes.

The organosiloxane is generally cyclic, the ring structures preferably containing from 3 to 6 Si atoms. Examples include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcycotetrasiloxane, octaphenylcyclotetrasiloxane, which may be used alone or in a mixture of 2 or more such compounds.

Suitable crosslinking agents are tri- or tetra-functional silane compounds. Preferred examples include trimethoxymethylsilane, triethoxyphenylsilane, tetramethoxysilane, tetraethoxysilane, tetra-n-propoxy-silane, tetrabutoxysilane.

Graft-active sites may be included into the polyorganosiloxane component of the silicone acrylate rubber by incorporating a compound conforming to any of the following structures:

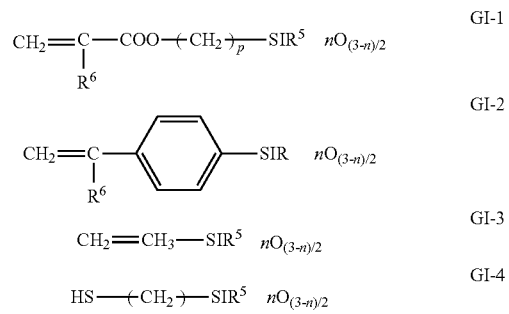

wherein
$R^5$ denotes methyl, ethyl, propyl or phenyl,
$R^6$ denotes hydrogen or methyl,
n denotes 0, 1 or 2, and
p denotes 1 to 6.

(Meth)acryloyloxysilane is a preferred compound for forming the structure (GI-1). Preferred (meth)acryloyloxysilanes include β-methacryloyloxyethyl-dimethoxy-methylsilane, γ-methacryloyl-oxy-propylmethoxy-dimethyl-silane, γ-methacryloyloxypropyl-dimethoxy-methyl-silane, γ-methacryloyloxypropyl-trimethoxy-silane, γ-methacryloyloxy-propyl-ethoxy-diethyl-silane, γ-methacryloyloxy-propyl-diethoxy-methyl-silane, γ-methacryloyloxy-butyl-diethoxy-methyl-silane.

Vinylsiloxanes, especially tetramethyl-tetravinyl-cyclotetrasiloxane, are suitable for forming the structure GI-2. p-Vinylphenyl-dimethoxy-methylsilane, for example, is suitable for forming structure GI-3. γ-Mercaptopropyldimethoxy-methylsilane, γ-mercaptopropylmethoxy-dimethyl-silane, γ-mercaptopropyl-diethoxymethylsilane, etc. are suitable for forming structure (GI-4). The amount of these compounds is from up to 10%, preferably 0.5 to 5.0% (based on the weight of polyorganosiloxane).

The acrylate component in the silicone acrylate composite rubber may be prepared from alkyl (meth)acrylates, crosslinkers and graft-active monomer units. Examples of preferred alkyl (meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate is particularly preferred.

Multifunctional compounds may be used as crosslinkers. Examples include ethylene glycol dimethacrylate, propylene glycol dimethacrylate, 1,3-butylene glycol dimethacrylate and 1,4-butylene glycol dimethacrylate.

The following compounds individually or in mixtures may be used for inserting graft-active sites: allyl methacrylate, triallyl cyanurate, triallyl isocyanurate, allyl methacrylate. Allyl methacrylate may also act as crosslinker. These compounds may be used in amounts of 0.1 to 20%, based on the weight of acrylate rubber component.

Methods of producing the silicone acrylate composite rubbers which are preferably used in the compositions according to the invention, and their grafting with monomers, are described, for example, in U.S. Pat. Nos. 4,888,388 and 4,963,619 both incorporated herein by reference.

The graft polymerization onto the graft base (herein C.1) may be carried out in suspension, dispersion or emulsion. Continuous or discontinuous emulsion polymerization is preferred. The graft polymerization is carried out with free-radical initiators (e.g. peroxides, azo compounds, hydroperoxides, persulfates, perphosphates) and optionally using anionic emulsifiers, e.g. carboxonium salts, sulfonic acid salts or organic sulfates.

The graft shell (C.2) may be formed of a mixture of

C.2.1 0 to 80%, preferably 0 to 50% more preferably 0 to 25% (based on the weight of the graft shell), of vinyl aromatic compounds or ring-substituted vinyl aromatic compounds (e.g. styrene, α-methylstyrene, p-methylstyrene), vinyl cyanides (e.g. acrylonitrile and methacrylonitrile), and C.2.2 100 to 20%, preferably 100 to 50%, more preferably 100 to 75% (based on the weight of the graft shell) of at least one monomer selected from the group consisting of (meth)acrylic acid ($C_1$-$C_8$)-alkyl esters (e.g. methyl methacrylate, n-butyl acrylate, tert.-butyl acrylate) and derivatives (e.g. anhydrides and imides) of unsaturated carboxylic acids (e.g. maleic anhydride and N-phenyl maleimide).

The preferred graft shell includes one or more (meth)acrylic acid ($C_1$-$C_8$)-alkyl esters, especially methyl methacrylate. A particularly suitable graft (co)polymer is available from Mitsubishi Rayon Co., Ltd. as METABLEN SX-005.

D. Glass Fiber

In various non-limiting embodiments, polycarbonate compositions may comprise glass fibers, such as, for example, continuous strands (rovings), long glass fibers, chopped glass strands, and combinations of any thereof. Glass fibers may comprise E-glass fibers, A-glass fibers, or C-glass fibers. The diameter of the glass fibers may be 5 µm to 25 µm, or any sub-range subsumed therein, such as, for example, 6 µm to 20 µm or 7 µm to 15 µm. Long glass fibers may have a length of 5 mm to 50 mm, or any sub-range subsumed therein, such as, for example, 5 mm to 30 mm or 7 mm to 25 mm. Long glass fibers are described, for example, in WO-A 2006/040087, which is incorporated by reference into this specification. Chopped glass strands may have an average length of at least about 50 µm and, in various non-limiting embodiments, at least 70 weight percent of the glass fibers in a sample of chopped glass strands used in polycarbonate compositions may have a length of at least about 60 µm.

Glass fibers may be sized or non-sized glass fibers. As used herein in connection with glass fibers, the term "size" refers to chemical compositions that are used to coat the surface of glass fibers before incorporation into a polycarbonate composition. A size fills pores in glass fiber and provides a covering or glaze that protects and lubricates glass fibers. A size may also modify the surface properties of glass fibers and may function to improve compatibility of the glass fiber and the polymeric matrix into which the glass fiber is incorporated.

Non-limiting size compositions may comprise an epoxy-based polymer and, optionally, an adhesion promoter or other non-epoxy-based polymer. For example, a size composition may comprise 50 to 100 wt. % of an epoxy-based polymer and 0 to 50 wt. % of an adhesion promoter and/or non-epoxy-based polymer, based on total weight of the size composition. A size composition may comprise an epoxy-based polymer and an adhesion promoter in any sub-range subsumed therein, for example, 70 to 100 wt. % or 80 to 100 wt. % of an epoxy-based polymer, and 0 to 30 wt. % or 0 to 20 wt. % of an adhesion promoter and/or non-epoxy-based polymer, based on total weight of the size composition. In various non-limiting embodiments, a size composition consists exclusively of epoxy-based polymer and optional adhesion promoter (i.e. the size composition is free from other non-epoxy-based polymers).

In various non-limiting embodiments, a size composition may comprise an epoxy-based polymer comprising an epoxy resin, an epoxy resin ester, an epoxy resin polyurethane, or a combination of any thereof. For example, an epoxy-based polymer may comprise an epoxy resin comprising a reaction product of epichlorohydrin and an aromatic alcohol having at least two hydroxyl groups, such as, for example, bisphenol A. Optional non-epoxy-based polymers may include, for example, polyurethanes, polyolefins, acrylate-containing polymers, styrene-containing polymers, polyamides, and combination of any thereof.

Non-limiting size compositions may comprise an adhesion promoter comprising a silane compound. Suitable silane compounds include, for example, silanes comprising at least one functional group selected from the group of an amino group, epoxy group, carboxylic acid group, vinyl group, mercapto group, and combinations of any thereof. These functional groups may function to bind to an epoxy-based polymer comprising a size composition. Silanes may also comprise one to three alkoxy groups that function to bind to glass fiber. In this manner, the silane improves adhesion of an epoxy-based polymer to the surface of glass fiber. Examples of suitable silanes include, but are not limited to, vinyltrichlorosilane; vinyltriethoxysilane; vinyltrimethoxysilane; γ-methacryloxypropyltrimethoxysilane; β-(3,4-epoxycyclohexyl)ethyl-trimethoxysilane; γ-glycidoxypropyltrimethoxysilane; N-β-(aminoethyl)-γ-aminopropyltrimethoxysilane; γ-aminopropyltriethoxysilane; N-phenyl-γ-aminopropyltrimethoxysilane; γ-mercaptopropyltrimethoxysilane; γ-chloropropyltrimethoxysilane; and combinations of any thereof.

In certain embodiments, a size composition comprising an epoxy-based polymer and, optionally, an adhesion promoter may be used in an amount such that the carbon content of the size composition is 0.1 to 1 wt. %, based on the total weight of the glass fibers and the size composition. A size composition may be used in an amount such that the carbon content of the size composition is 0.2 to 0.8 wt. % or 0.3 to 0.7 weight percent, based on the total weight of the glass fibers and the size composition.

In various non-limiting embodiments, the inventive composition may comprise greater than zero wt. % to 10.0 wt. % glass fiber, more preferably 0.5 wt. % to 5.0 wt. %, particularly preferably, 1.0 wt. % to 3.0 wt. %, most preferably 1.0 wt. % to 1.5 wt. % glass fiber, wherein the wt. %, all instances, is based on total composition weight including the weight of any sizing composition in the glass fiber weight.

E. Alumina

In various non-limiting embodiments, polycarbonate compositions may comprise alumina particles. As used herein, the term "alumina" refers to the various mineral forms of aluminum oxide/hydroxide. The term alumina includes, for example, corundum ($Al_2O_3$), boehmite ($\gamma$-AlO(OH)), diaspore ($\alpha$-AlO(OH)), and gibbsite ($Al(OH)_3$) (i.e., bayerite, doyleite, and nordstrandite), and combinations of any thereof. The term alumina also includes the various phases and polymorphic forms of aluminum oxide/hydroxide.

Non-limiting polycarbonate compositions may comprise alumina particles having a particle size ($d_{50}$) of less than 150 μm, less than 100 μm, or less than 50 μm. For example, alumina particles may have a particle size ($d_{50}$) in the range of 25 μm to 150 μm, or any sub-range subsumed therein, such as, for example, 25 μm to 100 μm, 2.5 μm to 75 μm, 30 μm to 70 μm, or 30 μm to 50 μm. Non-limiting examples of suitable alumina particles include, for example, the alumina particles available from Sasol North America Inc., Houston, Tex. USA, under the names PURAL, CATAPAL, DISPERAL, DISPAL, PURALOX, CATALOX, and CERALOX.

Non-limiting embodiments include a composition which may comprise greater than zero wt. % to 7.0 wt. % alumina particles, more preferably 0.5 wt. % to 5.0 wt. %, most preferably 0.5 wt. % to 1.0 wt. % alumina particles, wherein the wt. %, ail instances, is based on total composition weight.

F. Borate Compound

The boron compound suitable in the context of the present invention is not particularly limited so long as it is a compound having a boron atom. Examples include boric acid, boron oxide and borates. The borates include zinc borates such as zinc tetraborate, zinc metaborate and basic zinc borate, barium borates such as barium orthoborate, barium metaborate, barium diborate and barium tetraborate, lead borate, cadmium borate and magnesium borate. Such boron compounds may be used alone or in combination as a mixture of two or more of them.

The preferred boron compound is zinc borate. The preferred zinc borate has the general chemical formula $mZnO \cdot nB_2O_3 \cdot xH_2O$ where the ratio of x/m/n is around 0-7/1-5/2-6. This borate is well known and commercially available. The average particle diameter is between 2 and 10 μm, advantageously 4 to 6 μm, alternatively 8-10 μm. Particle size and particle diameter always means the average particle diameter.

G. Other Components

The inventive composition may further include additives that are known for their function in the context of thermoplastic molding compositions that contain poly(ester)carbonates. These include any one or more of lubricants, mold release agents, for example pentaerythritol tetrastearate, nucleating agents, antistatic agents, thermal stabilizers, light stabilizers, hydrolytical stabilizers, fillers and reinforcing agents, colorants or pigments, as well as further flame retarding agents or a flame retarding synergists.

The inventive compositions may be prepared conventionally using conventional equipment and following conventional procedures.

The inventive composition may be used to produce moldings of any kind by thermoplastic processes such as injection molding, extrusion and blow molding methods.

EXAMPLES

The present invention is further illustrated, but is not to be limited, by the following examples. All quantities given in "parts" and "percents" are understood to be by weight, unless otherwise indicated. In preparing the compositions described below the following components were used in the amounts as given in Table I:

PC-A a bisphenol-A based homopolycarbonate having melt flow rate of about 4 g/10 min (at 300° C., 1.2 Kg) per ASTM D 1238, commercially available from Bayer MaterialScience as MAKROLON 3208;

PC-B a branched homopolycarbonate based on bisphenol A, weight average molecular weight 33000 to 36500, melt flow index of 3.5 g/10 min (300° C./1.2 kg) per ASTM D-1238, commercially available from Bayer MaterialScience as MAKROLON 1239

PTT polytrimethylene terephthalate, commercially available from Shell as CORTERRA polymer 200;

PET polyethylene terephthalate, commercially available as PET 12822 from Eastman Chemical;

ELASTOMER A methyl methacrylate (MMA)-grafted siloxane (Si)-butyl acrylate (BA)composite rubber containing MMA shell and Si-BA in the core. The weight ratio of Si/BA/MMA is 80/10/10;

ELASTOMER B methyl methacrylate (MMA)-grafted siloxane (Si)-butyl acrylate (BA)composite rubber containing MMA shell and Si-BA in the core. The weight ratio of Si/BA/MMA is 10/80/10;

FLAME RETARDANT A bisphenol diphosphate phenyl ester, commercially available from Chemtura as REOFOS BAPP;

FLAME RETARDANT B bisphenol-A bis(diphenyl phosphate), commercially available from Ablemarle as NCENDEX P 30;

FLAME RETARDANT C encapsulated polytetrafluoroethylene (PTFE) with styrene acrylonitrile (SAN), commercially available from Chemtura as BLENDEX 449;

ZINC BORATE having an average particle diameter of 5 microns, commercially available from Chemtura as ZB-467;

ALUMINA hydroxy aluminum oxide, commercially available from Sasol North America Inc. as PURAL 200;

GLASS FIBER chopped glass strands commercially available from Owens Corning as CRATEC 415A-17C; and STABILIZER a benzotriazole type UV absorber, commercially available from Adeka Palmarole as ADK STAB LA-31.

In the preparation of exemplified compositions, the components and additives were melt compounded in a twin screw extruder ZSK 30 at a temperature profile from 120 to 300° C. The pellets obtained were dried in a forced air convection oven at 120° C. for 4 to 6 hours. The parts were injection molded (melt temperature 265 to 285° C. mold temperature about 75° C.).

Gloss (at 20 degrees) was measured in accordance with the procedure set forth in ASTM D523.

TABLE I

|  | Ex. 1 | Ex. 2 | Ex. 3 | Ex. 4 |
|---|---|---|---|---|
| PC-A | 80 | 80 | 80 | 80 |
| PTT | 20 | 20 | | |
| PET | | | 20 | 20 |
| ELASTOMER A | 8 | 8 | 8 | 8 |
| FLAME RETARDANT A | 8 | 8 | 8 | 8 |
| FLAME RETARDANT C | 0.5 | 0.5 | 0.5 | 0.5 |
| ZINC BORATE | 2.5 | 2.5 | 2.5 | 2.5 |
| ALUMINA | | 1 | | 1 |
| Gloss at 20 degrees | 49 | 64 | 37 | 62 |

As can be appreciated by reference to Table I, the increase in gloss is observed when adding a small amount of alumina to compositions containing polytrimethylene terephthalate (Ex. 1 and Ex. 2) or polyethylene terephthalate (Ex. 3 and Ex. 4).

As can be appreciated by reference to Table II, an increase in gloss is also observed when adding a small amount of alumina to a glass fiber containing composition, L, a, and b color values were determined for Ex. 5 and 6 in accordance with ASTM E313 and are reported in Table II below.

TABLE II

|  | Ex. 5 | Ex. 6 |
|---|---|---|
| PC-B | 73 | 72.5 |
| FLAME RETARDANT B | 14 | 14 |
| GLASS FIBER | 5 | 5 |
| ELASTOMER B | 7.5 | 7.5 |
| STABILIZER | 0.5 | 0.5 |
| ALUMINA | | 0.5 |
| Gloss at 20 degrees | 71.6 | 88.0 |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

Various aspects of the subject matter described herein are set out in the following numbered clauses:

1. A thermoplastic molding composition comprising: A) 50 to 98 wt. % aromatic poly(ester) carbonate having a weight-average molecular weight of at least 25,000; B) a flame retardant; C) 1 to 20 wt. % of a graft (co)polymer having a core-shell morphology, including a grafted shell that contains polymerized alkyl(meth)acrylate and a composite rubber core that contains interpenetrated and inseparable polyorganosiloxane and poly(meth)alkyl acrylate components, wherein said, core is in the form of particles having median particle size of 0.05 to 5 microns and glass transition temperature below 0° C., and wherein weight ratio of polyorganosiloxane/poly(meth)alkylacrylate/rigid shell is 5-90/5-90/5-15; D) greater than zero wt. % to 7.0 wt. % aluminum oxide, wherein the sum of the wt. %, totals 100 and wherein the composition exhibits an increased gloss level at 20 degrees over that of a similar composition not containing aluminum oxide.

2. The composition according to clause 1 further including from greater than zero wt. % to 10.0 wt. % of glass fibers.

3. The composition according to clause 1 further including 1 wt. % to 30 wt. % of a thermoplastic polyester.

4. The composition according to clause 3, wherein the thermoplastic polyester is selected from the group consisting of polyethylene terephthalate, polybutylene terephthalate, polyethylene naphthalate, polybutylene naphthalate, polytrimethylene terephthalate, poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), or a combination thereof.

5. The composition according to clause 1, wherein the polycarbonate is linear.

6. The composition according to clause 1, wherein the polycarbonate is branched.

7. The composition according to clause 1 wherein alkyl (meth)acrylate is butylacrylate.

8. The composition according to clause 1 further including a boron compound.

9. The composition according to clause 8, wherein the boron compound is zinc borate.

10. The composition according to clause 1 further containing at least one member selected from the group consisting of lubricant, mold-release agent, nucleating agent, antistatic, thermal stabilizer, hydrolytical stabilizer, light stabilizer, colorant, pigment, filler, reinforcing agent, flameproofing agent other than component E), and flameproofing synergist.

What is claimed is:

1. A thermoplastic molding composition comprising:
    A) 50 to 98 wt. % aromatic poly(ester) carbonate having a weight-average molecular weight of at least 25,000;
    B) a flame retardant;
    C) 1 to 20 wt. % of a graft (co)polymer having a core-shell morphology, including a grafted shell that contains polymerized alkyl(meth)acrylate and a composite rubber core that contains interpenetrated and inseparable polyorganosiloxane and poly(meth)alkyl acrylate components, wherein said core is in the form of particles having median particle size of 0.05 to 5 microns and glass transition temperature below 0° C., and wherein weight ratio of polyorganosiloxane/poly(meth)alkylacrylate/rigid shell is 5-90/5-90/5-15;
    D) greater than zero wt. % to 7.0 wt. % aluminum oxide particles having a particle size ($d_{50}$) of 25 μm to 150 μm, wherein the sum of the wt. %, totals 100 and wherein the composition exhibits an increased gloss level at 20 degrees over that of a similar composition not containing aluminum oxide.

2. The composition according to claim 1 further including from greater than zero wt. % to 10.0 wt. % of glass fibers.

3. The composition according to claim 1, wherein the polycarbonate is linear.

4. The composition according to claim 1, wherein the polycarbonate is branched.

5. The composition according to claim 1 wherein the composite rubber core comprises butylacrylate.

6. The composition according to claim 1 further containing at least one member selected from the group consisting of lubricant, mold-release agent, nucleating agent, antistatic, thermal stabilizer, hydrolytical stabilizer, light stabilizer, colorant, pigment, filler, reinforcing agent, flameproofing agent other than component E), and flameproofing synergist.

7. The composition according to claim 1 further including 1 wt. % to 30 wt. % of a thermoplastic polyester.

8. The composition according to claim 7, wherein the thermoplastic polyester is selected from the group consisting of polyethylene terephthalate, polybutylene terephthalate, polyethylene naphthalate, polybutylene naphthalate, polytrimethylene terephthalate, poly(1,4-cyclohexylenedimethylene 1,4-cyclohexanedicarboxylate), poly(1,4-cyclohexylenedimethylene terephthalate), poly(cyclohexylenedimethylene-co-ethylene terephthalate), or a combination thereof.

9. The composition according to claim 1 further including a boron compound.

10. The composition according to claim 9, wherein the boron compound is zinc borate.

\* \* \* \* \*